United States Patent

[11] 3,573,816

[72] Inventor Walter Helgeland
Nashua, N.H.

[21] Appl. No. 544,731
[22] Filed Apr. 25, 1966
[45] Patented Apr. 6, 1971
[73] Assignee Sprague Electric Company
North Adams, Mass.

[54] PRODUCTION OF ELECTRIC CIRCUIT ELEMENTS

4 Claims, 3 Drawing Figs.

[52] U.S. Cl. .......... 340/419, 307/125, 318/29
[51] Int. Cl. .......... G08b 1/08
[50] Field of Search .......... 318/20.745, 20.750, 20.751; 340/222, 233, 419; 324/62, 63

[56] References Cited

UNITED STATES PATENTS 2,883,617 4/1959 Lathrop .......... 324/62
3,122,689 2/1964 Atkinson .......... 318/29
3,345,558 10/1967 Christian .......... 318/29X

*Primary Examiner*—John W. Caldwell
*Assistant Examiner*—David L. Trafton
*Attorney*—Connolly and Hutz

ABSTRACT: A method and apparatus is provided for producing electrical circuit elements at a high rate and with accurate electrical characteristics. An amplifier is provided with a DC voltage input which is changing in one direction in response to a changing characteristic of an electric circuit element under manufacture. When the input voltage, together with a regenerative feedback from the amplifier output, reaches a predetermined value, the amplifier produces a pulse output which can be used to terminate the circuit element manufacture.

PRODUCTION OF ELECTRIC CIRCUIT ELEMENTS

The present invention relates to the making of electric circuit elements such as resistors, inductors and the like.

Among the objects of this invention is the provision of novel methods and apparatus for making the foregoing elements.

Additional objects of the present invention include novel testing methods and apparatus that improve production efficiency.

The foregoing as well as further objects of the present invention will be more fully appreciated from the following description of several of its exemplifications, reference being made to the accompanying drawings wherein.

Figure 1:
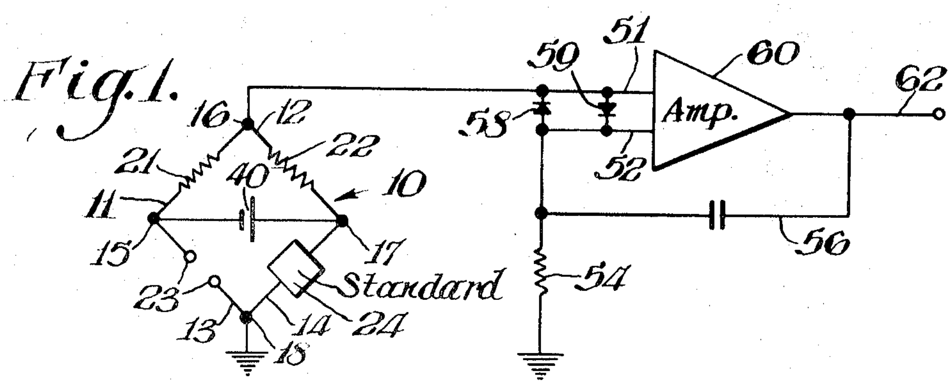
FIG. 1 is a schematic circuit diagram illustrating a testing arrangement pursuant to the present invention.

For the automatic production of electric circuit elements at a high rate and with accurate electrical characteristics, it is essential to closely follow the changes in characteristics as production proceeds, and to promptly stop the change when the desired value is reached. For example, in the helixing of resistors as described in U.S. Pat. No. 1,859,112 granted May 17, 1932, the cutting of the helix is monitored by measuring the resistance of the resistor, and resistors of the highest accuracy are produced when the helixing can be automatically terminated as the desired resistance is attained.

According to the present invention a DC voltage that changes in one direction, such as in response to the measurement of resistance during the foregoing resistor helixing, promptly indicates when it arrives at a predetermined value if it is applied to the input of a DC amplifier biased to undergo a change in polarity when the voltage reaches that predetermined value, and the amplifier has its output capacitively coupled to its input in regenerative sense to cause the response time of the amplifier to be reduced.

The amplifier preferably has a response time of not more than about 100 microseconds in the absence of the feedback. With such amplifiers the foregoing feedback reduces the response time to practically zero and even tends to make the response time slightly negative. The negative response time is attributable to the fact that the feedback causes the amplifier to sense that a null is approaching. This makes up for some of the unavoidable delays in physically terminating the adjustment operation.

In a particularly preferred embodiment the amplifier has a double-ended input, one of the input ends is returned to ground through an impedance, and the feedback is to said returned input end.

The voltage delivered to the amplifier is conveniently supplied from a measuring circuit such as a bridge. In order to keep the delivered voltage from being blurred by stray electrical pickup, the bridge is energized by a floating source such as a battery. Even 90 volts or more can be very simply used to operate the bridge by means of a small size dry battery pack connected only to the bridge at locations that are not grounded. The bridge output can then have one side grounded.

A high bridge energizing voltage is desirable for the reason that it provides a high output voltage from the bridge, thereby increasing the accuracy and rate of response of the measuring. Where the energizing voltage is higher than the amplifier input can tolerate, the input should be protected as by shunting it with diodes that are essentially nonconductive at low voltages, but become conductive at higher voltages to prevent buildup of excessive voltage.

The above-outlined measuring method and apparatus is admirably suited to the automatic continuous manufacture of resistors, for example, in which an elongated nonconductive strip can be supplied, carrying a wide substantially continuous electrically resistive film along with electrically conductive contact elements along an edge of the film. Lines are machined in the film to cut it into a sinuous path between contact elements to provide the desired resistance, and an extra deep line is machined at the end of the desired length of strip to weaken the strip at that location so that it can be broken therefor severing the strip into separate resistor units.

The electrically conductive contact elements can be all along one edge of the resistive film, or along both edges in which event the contact elements are desirably in the form of continuous edge coatings.

Electron beam machining, as described for example in U.S. Pat. Application Ser. No. 354,649 filed Mar. 25, 1964, is a particularly desirable technique to use for the machining of the present invention. Such machining is best carried out in a high vacuum and accordingly lends itself to a continuous operation in which the electrically resistive and/or conductive coatings are deposited on the strip for machining, by an evaporation technique also carried out in high vacuum. The strip is preferably ceramic and can be continuously formed and cured as it is advanced to the coating and then to the machining stages. It can also have its resistive film continuously coated after the machining to make a completed element for use with or without leads that can be attached to the conductive coating elements.

For continuous electron beam machining it is preferred to have the electron beam furnished by a gun having a prefocussed-type cathode that is readily replaceable with very little trouble and very quickly. Because of the relatively short life of gun cathodes any delays in replacing them can seriously affect production, particularly if the strip is coated as it is fed to the machining.

Turning now to the drawings, the circuit of FIG. 1 has a Wheatstone bridge 10 with four arms 11, 12, 13 and 14. In arms 11 and 12 there are inserted proportioning resistors 21, 22, and arm 14 has a standard resistor 24 which can be in the form of a conventional resistance decade box. Arm 13 has terminals 23 which can be connected to a resistor being tested. With this arrangement the standard resistance 24 can be selected to have a resistance in such a relation with the resistance being tested as corresponds to the relationship between resistances 22 and 21 respectively.

A DC source such as a battery 40 is connected between opposing bridge junctures 15, 17 so that current flows through proportioning resistors 21, 22 in series with each other. Bridge juncture 16 between the proportioning resistors is connected to an input terminal 51 of an amplifier 60 that has a short response time, preferably not over 50 microseconds, although one with as much as 100 microseconds can be used. The remaining bridge juncture 18 is grounded.

Amplifier 60 is shown as having a dual-ended input with a second input lead 52 which is returned to ground through an impedance such as resistance 54. Oppositely poled diodes 58, 59 are bridged across between input leads 51, 52, and a feedback capacitor 56 is connected between output lead 62 of the amplifier and the ungrounded end of impedance 54.

A resistor being helixed as described in U.S. Pat. No. 1,859,112 can have its terminals connected to test terminals 23. The standard resistor 24 as well as proportioning resistors 21, 22 are so selected that before the helixing commences, the test resistor has a resistance that is lower than desired, but the machining of the helix causes the test resistance to increase in value. At the commencement of machining, bridge 10 is unbalanced so that a substantial voltage appears between junctions 16 and 18. As the machining proceeds this voltage decreases and eventually reaches zero when the machining brings the test resistance to the desired value. Any overshooting of the machining will cause the voltage to reverse in polarity and then increase in the opposite sense.

Amplifier 60 amplifies the DC voltage between its input leads 51, 52 and delivers a sharp pulse at its output terminal 62 as the input voltage undergoes a change in polarity, and the output pulse can then be used to terminate the machining as for example in the manner taught in application Ser. No.

354,649. In the illustrated embodiment amplifier 60 delivers output signals oppositely phased as compared to signals applied to its input terminal 51. Feedback capacitor 56 returns some of the rapidly changing portion of the output signal to input lead 52 where it acts in a regenerative sense to increase the effective input signal between leads 51 and 52. This has a sharp effect as the voltage between bridge junctions 16, 18 is nearing zero, and causes amplifier 60 to act much like a one-shot oscillator with its oscillation commencing even before the bridge output reaches zero. As a result the pulse output at 62 will show a response that can be as late as a few microseconds and as early as −30 microseconds or so.

The shortest response times are obtained with the highest voltages supplied by battery 40, and 90 volts are preferred. Transistor-type amplifiers usually have extremely short responses, and since many of these might be damaged if their inputs are subjected to more than a dozen or so volts, the construction of FIG. 1 has solid state diodes 58, 59 oppositely poled across the input leads. The diodes themselves can also be damaged by high voltages, but will safely prevent the input leads from being subjected to a broad range of potentials higher than those at which the diodes become good conductors, so long as the output impedance of the bridge remains high. Resistors 22 and 24 are accordingly best selected to have relatively high resistances, at least 10,000 ohms for example, where the diodes can carry 10 milliamperes.

When there is no test resistor connected in bridge arm 13, and resistance 21 is relatively low, nearly all of the battery voltage will appear across junctions 16, 18. On the other hand, during production an occasional test resistor will show a very low resistance and when resistor 21 is also relatively high, there will again be a situation in which nearly the full battery voltage will appear across junctions 16, 18, this time with opposite polarity.

Impedance 54 is used as a load for the feedback circuit and can be a 10,000 ohm resistance. Too much resistance will cause the voltage at the amplifier input terminals to be excessively reduced by the portion of the bridge output voltage developed across this load. Inasmuch as the feedback is essentially AC in nature, the load 54 can also be an inductor.

The amplifier 60 can also be of single-ended type having one of its input terminals directly grounded. The feedback can then be returned to the ungrounded input terminal as by taking the feedback from amplified signals in phase with the amplifier input. Amplifiers can have more than one way to feed back signals even when of the single-ended input type. Thus a transistor input stage operated as a common emitter amplifier can have the feedback supplied to its base or to its emitter.

An amplifier gain of as little as 10 is adequate for most purposes, but it is preferred to have gains of from 50 to 10,000, typically 1000. Response times tend to be temperature-dependent so that amplifiers with double-ended inputs where temperature and other effects can be balanced out, are most desirable. Vacuum-tube amplifiers, whether or not with double-ended inputs, tend to have cathode heating variations that keep the response time from holding a uniformly low level.

Figure 2:
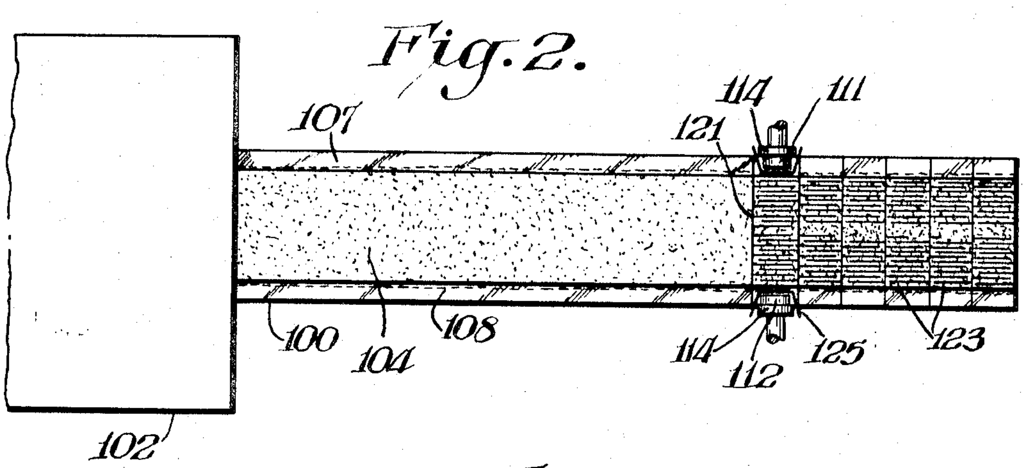
FIG. 2 is a plan view of a portion of a machining apparatus showing resistors being made according to the present invention.

The resistor production illustrated in FIG. 2 involved a continuous strip 100 of electrically nonconductive material such as ceramic, which can be supplied from a coating chamber 102 where it is coated with a film of electrically resistive material 104 such as a nickel-chromium alloy, and a pair of electrically conductive edge coatings 107, 108, such as those sintered from mixtures of silver powder and glass frit.

The coated strip is fed between a pair of electrically conductive guide rollers 111, 112 that are flanged as at 114 to accurately position themselves in contact with the respective edge coatings 107, 108. The electrically resistive coating 104 is not obstructed by the rollers, so that it remains exposed for machining by an electron beam, not shown, which is projected perpendicularly downwardly on the face of the coating.

The machining cuts lines 121 into the electrically resistive coating so that it becomes a sinuous electrical path between edge coatings 107, 108. The particular electron beam technique for this purpose can be as described in U.S. Pat. No. 3,140,379 granted Jul. 7, 1964. For high speed production, however, it is preferred to use an unpulsed beam of extremely constant current, as well as a very constant DC supply for heating the cathode that emits the beam current. This assures straightness of the machined edges.

The process of the present invention further includes supplementary machining steps to cut transverse grooves 123 across the entire strip deeply enough to weaken it. It only takes about a 2 to 4 mil groove cut this way in a 10 to 15 mil thick strip to enable the strip to be easily and cleanly broken at those grooves. Inasmuch as the groove is accurately machined through the electrically resistive coating, any irregularities introduced during the breaking off do not affect the resistance of the broken-off units.

An electron beam current of only about 150 microamperes at 20 kilovolts will cut a groove 3 mils wide and 3 mils deep in ceramic when traced across the ceramic at about one-half inch per second. A more intense beam will do the same grooving at an even greater rate. The 150 microampere 20 kilovolt beam can also be used to machine the electrically resistive layer at speeds of about 15 inches per second, where the layer is about 0.1 mil thick. At about 10 inches per second the same machining will also glaze a ceramic surface under the electrically resistive coating, so that the exposed ceramic surface is not as susceptible to contamination or electrical leakage during handling or use of the resistor.

During the machining the rollers 111, 112 can be connected to the test terminals 23, 23 so that the machining is promptly stopped when the resistance reaches the desired value. The shorter the time required to stop the machining of lines 121 after the correct resistance is reached, the faster the machining can be carried out without exceeding the same tolerance in the final resistance value. Tolerances of ±0,1 percent are readily attained pursuant to the present invention at machining speeds as high as 50 inches per second, by setting the standard resistance 24 0.1 percent low.

The groove 123 marking the trailing end of each resistor unit should be machined before the lines 121, or both operations can be overlapped somewhat as long as the lines 121 are completed after the grooving is finished, to enable the automatic termination of the machining to be most effective.

As shown at 125, it is preferred that the contact rollers 111, 112 be protected from the machining zone by shields that are best made of electrically conductive material and grounded. Without such shields these rollers are apt to pick up stray current from the electron beam or from secondary electrons or ions emitted during the machining or from condensing particles of evaporated metal, and in this way decrease the accuracy of the automatic machining termination.

In the strip treatment operation of FIG. 2, the strip 100 can be advanced either in steps, or in a continuous stepless manner. When the advancing is by steps, the strip can be held stationary between steps, and the machining completed between steps. Each step can then move the strip a distance corresponding to the longitudinal distance allocated for an individual resistor unit.

Where the strip 100 is advanced in stepless fashion, the machining can be effected with the electron beam adjusted to go through its various sweeps with a component of motion corresponding to the strip motion. Thus, with resistor units three-fourths inch long and one-fourth inch wide made from a three-fourths inch wide strip at the rate of 10 per minute, the strip movement is about one twenty-fourth inch per second. Grooving at one-fourth inch per second takes 3 seconds to complete a groove 123, and by inclining the sweep direction of the grooving beam about 8° with respect to the transverse direction of the strip, the grooving line will be exactly perpendicular to the strip's longitudinal axis. However, it is not necessary to so tilt the grooving inasmuch as even without it all grooves will be parallel to each other if traced in the same direction across the strip, so that the final resistor units will be of uniform appearance, with the edges having their electrically conductive terminal coatings slightly out of perpendicularity.

The machining of lines 121 is readily adjusted to compensate for continuous strip travel during the machining, as by incorporating in the beam-stepping program a suitable current component fed to a magnetic deflection coil used for longitudinal deflection. The same technique can also be used for the grooving.

The machining of lines 121 is preferably arranged so that the sinuous electrically resistive path between the terminals of each unit is generally of uniform electrical resistance throughout at least most of its length. This spreads the heat generation during use in such a manner that hotspots are less likely to develop, and the heat dissipation characteristics are relatively high. Inasmuch as heat dissipation is better at the edges of each resistor unit, the resistance in those locations can be made somewhat higher as by extending each line 121 a little closer toward the edge that it does not reach, and having the spacing between lines a little closer near the conductive terminals.

Inasmuch as very thin electrically resistive films generally have unavoidable variations that affect the amount of machining needed, the machining of lines 121 can be arranged so that about half these lines are machined from one terminal coating 107, and the remainder then commenced from the other edge of the strip. The completion of the machining can then leave some unlined section near the center of the strip, where it will reduce the tendency to hotspot development.

Also because of the variations in the electrically resistive film, successive units can require 20 percent or more variation in the number of lines 121 required to bring them to the same final resistance value. It is accordingly helpful to automatically determine the number of lines needed, as by using the technique described on pages 56—57 of the Dec. 11, 1963 DESIGN NEWS issue. In this modification it is important to complete the grooving 123 before commencing the machining of lines 121.

Figure 3:
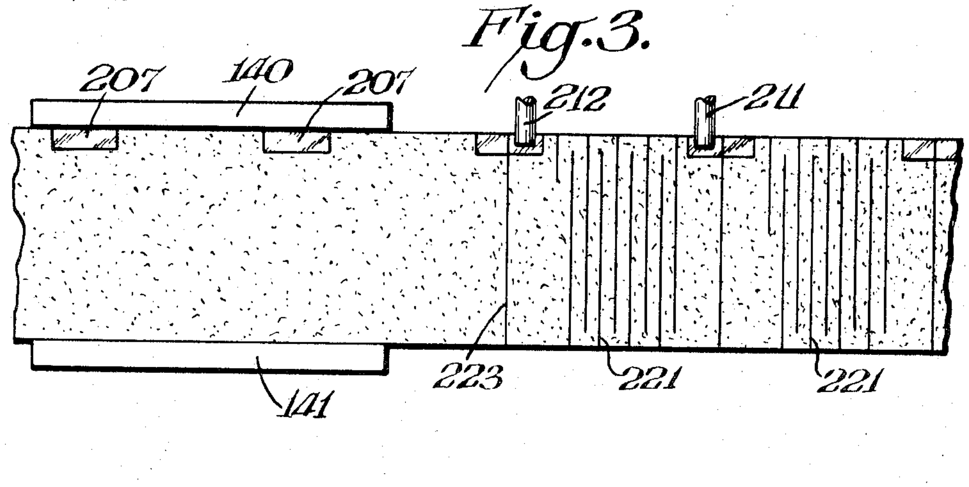
FIG. 3 is a fragmentary view similar to that of FIG. 2 showing a modified arrangement for making resistors and also typical of the present invention.

The arrangement of FIG. 3 is a modification of that of FIG. 2 in which resistance-increasing lines 221 are machined in a direction transverse to the strip. The electrically conductive terminations for individual resistance units thus made can be portions of an edge coating that is originally continuous and is cut into separate bits by the lines 221. However, in the illustrated arrangement the terminations are cut from spaced edge coating segments 207. Transverse grooves 223 that separate the individual resistor units can also be used to cut the segments 207 so that each segment provides the trailing terminal for one unit and the leading terminal for the next. Contact rollers 211, 212 are shown with both on one side of the strip, guiding being provided as by fixed bars 140, 141. By alternating terminal coatings along the opposite edges of the strip, the contact rollers can also be disposed along the opposite edges.

A feature of the technique of FIG. 2 is that the grooves 123 act as accurately located boundaries for the lines 121 so that the sinuous path these lines form can be accurately provided. It is generally difficult to have such accuracy where the edges of the strip itself are used as guides, as in the technique of FIG. 3. The latter technique can accordingly be improved by machining longitudinally extending side boundaries for each resistor unit, before the lines 221 are machined.

The machining of FIG. 2 and FIG. 3 can be effected with grinding wheels if desired, particularly where the units are of relatively large size and there is ample room to receive the grinding wheel between the terminal connectors. The electron beam machining is much more adaptable to miniature operations and in the making of integrated circuits of miniature and microminiature size.

The measuring techniques described in connection with FIG. 1 can be used with resistors that have their resistances adjusted by mechanical grinding as in U.S. Pat. No. 1,859,112, by electron beam machining, or in any other way. Similarly they can be used in the production of flat resistors as in FIGS. 2 and 3, or of cylindrical resistors. These techniques can also be used in the production of inductors as by machining a helix in an electrically conductive coating on a cylindrical support, or in the production of capacitors as by machining away portions of one of its electrodes. The standard 24 can then be a standard inductor or capacitor, respectively, the bridge operated with AC, and its output rectified to give a DC signal that develops a strong amplified output pulse at lead 62 even though the rectified output does not go through a polarity reversal. A polarity reversal effect can also be obtained by biasing the input of the amplifier with the same polarity as the DC signals to be amplified. A DC bias of 0.1 volt when the bridge is energized by a 220-volt r.m.s. AC power and the bridge rectification is of the peak type, will introduce a balancing error of less than 0.05 percent, which is well within most tolerances.

AC operation of the bridge can be interfered with when the circuit element being adjusted has a rough surface. Machining of a rough surface tends to generate AC variation because of the roughness, and these variations increase in intensity as the machining speed increases.

On the other hand, DC bridge operations are easily carried out even when machining is effected with an electron beam whose beam current passes through the unit being tested. By effecting the machining so that it progresses toward the grounded terminal of the unit being adjusted and extends over at least about 70 percent of the original distance between terminals the beam current passing through the remaining 30 percent will not introduce significant error. Thus a 100 microampere beam current through a resistive film of 300 ohm resistance that remains unmachined will cause a 0.03 volt potential to be developed across that resistance. This is well within most production tolerances where the bridge is operated at 90 volts.

Obviously many modifications and variations of the present invention are possible in the light of the above teachings. It is, therefore, to be understood that within the scope of the appended claims the invention may be practiced otherwise than as specifically described.

I claim:

1. A process for promptly terminating the adjustment of a resistor to a predetermined value, which process comprises adjusting the resistance while the resistor is connected in a measuring circuit that develops a DC voltage which is a measure of the adjustment, applying the voltage to the input of a DC amplifier biased to undergo a change in polarity when the applied voltage reaches the predetermined level, capacitively coupling the output of the amplifier to its input grounded through an impedance in regenerative feedback sense to cause the response time of the amplifier to be reduced, and terminating the adjustment when the output of the amplifier shows that its input polarity is changing.

2. The combination of claim 1 in which the measuring circuit is a bridge that contains a floating source of DC voltage.

3. The combination of claim 2 in which the floating source is a battery that generates a voltage of at least about 45 volts.

4. The combination of claim 1 in which the amplifier has a response time of not more than about 100 microseconds in the absence of the feedback.